(12) United States Patent
Bennett

(10) Patent No.: US 10,303,342 B2
(45) Date of Patent: May 28, 2019

(54) ALL MEDIA STORY TELLING SYSTEM AND METHOD

(71) Applicant: Whichbox Media Inc., Dallas, TX (US)

(72) Inventor: Bettina Bennett, Dallas, TX (US)

(73) Assignee: WHICHBOX MEDIA INC., Dallas, TX (US)

( * ) Notice: Subject to any disclaimer, the term of this patent is extended or adjusted under 35 U.S.C. 154(b) by 253 days.

(21) Appl. No.: 15/455,214

(22) Filed: Mar. 10, 2017

(65) Prior Publication Data
US 2017/0185256 A1    Jun. 29, 2017

Related U.S. Application Data

(63) Continuation of application No. 13/580,370, filed as application No. PCT/US2011/026304 on Feb. 25, 2011, now Pat. No. 9,595,021.

(60) Provisional application No. 61/308,117, filed on Feb. 25, 2010.

(51) Int. Cl.
| | |
|---|---|
| G06F 3/0484 | (2013.01) |
| G06Q 10/10 | (2012.01) |
| G09B 5/00 | (2006.01) |
| G06F 17/24 | (2006.01) |
| G06Q 30/02 | (2012.01) |
| G06Q 50/00 | (2012.01) |

(52) U.S. Cl.
CPC .......... *G06F 3/0484* (2013.01); *G06F 17/248* (2013.01); *G06Q 10/10* (2013.01); *G09B 5/00* (2013.01); *G06Q 30/0277* (2013.01); *G06Q 50/01* (2013.01)

(58) Field of Classification Search
CPC .......... G06F 17/248; G06F 15/16; G06F 3/01
See application file for complete search history.

(56) References Cited

U.S. PATENT DOCUMENTS

| | | | |
|---|---|---|---|
| 9,727,221 B2* | 8/2017 | Han | G11B 27/034 |
| 2002/0124048 A1* | 9/2002 | Zhou | G06F 17/30017 |
| | | | 709/203 |
| 2004/0267816 A1 | 12/2004 | Russek | |
| 2008/0005669 A1* | 1/2008 | Eilertsen | G11B 27/034 |
| | | | 715/210 |
| 2010/0017718 A1* | 1/2010 | Bohms | G06F 17/30265 |
| | | | 715/719 |

* cited by examiner

*Primary Examiner* — Andrea C Leggett
(74) *Attorney, Agent, or Firm* — DLA Piper LLP (US)

(57) ABSTRACT

An all media story-telling system and method are disclosed. The system and method provide any media, integrated storytelling, provide content management, distribution and syndication across multiple domains, and provide a relevancy-based match between content and advertising.

20 Claims, 10 Drawing Sheets

FIG. 7 dia story-telling system and method that provides any media, integrated story-telling tools, provides content management/ distribution of such any/all media content as well as the syndication across multiple domains, and it is to this end that the disclosure is directed.

ALL MEDIA STORY TELLING SYSTEM AND METHOD

PRIORITY CLAIM/RELATED APPLICATION

This application is a continuation of and claims priority under 35 USC 120 to U.S. patent application Ser. No. 13/580,370, filed on Nov. 12, 2012 and entitled "All Media Story Telling System and Method" which in turn claims priority to and is a US national stage filing under 35 USC 364 and 365 from PCT Patent Application Serial No. US2011/026304 filed Feb. 25, 2011 and entitled "All Media Story Telling System and Method" that in turn claimed priority and benefit under 35 USC 119(e) and the Paris Convention to U.S. Provisional Patent Application Ser. No. 61/308,117 filed on Feb. 25, 2010 and entitled "All Media Story Telling System and Method", the entirety of each of which are incorporated herein by reference.

APPENDIX

Attached to this specification is a 32 page Powerpoint presentation as an appendix that forms a part of the specification and incorporated herein by reference.

FIELD

The disclosure relates generally to a system and method for providing electronic story-telling with all types of media.

BACKGROUND

People have been reading books for millennia. The format of a book, a paged collection of text and images, is a familiar metaphor for disseminating information. In the age of electronic media, it is desirable to be able to provide a similar experience.

Today, there are companies like Facebook, YouTube, Flickr, Photobucket, etc. for individual users that allow those users to publish content on the internet. All of those companies target everyone who uses the Internet, and each provides a different suite of tools and services to try to attract the broadest possible swath of internet users. While all provide platforms for individual users to publish content on the internet, they do it in different ways from each other. While Facebook allows users to share their profiles, and upload images and videos, as well as updates on events in their daily lives, YouTube focuses on providing a platform for users to share videos only, Flickr and Photobucket focus on providing users with online photo and video storage and sharing capabilities.

The results for the average user are that there is no place for them to "tell a story" and share that story in one single place and as ONE cohesive, single story. Currently, if someone has a story about a trip to India, they can upload their video to YouTube, store and share their photos on Flickr or Photobucket, update their status on Facebook, post their travel journal on a personal blog, may share their recipe of a favorite dish they had on their trip on a how-to-site and have no place to share any kind of audio files easily. To share that entire story with their friends, family or other audience, those friends (or other audiences) have to go to each of the individual websites, where separate components of that story, based on media type, are stored and can be shared. It would require all those friends to also become members on all those different sites, possibly create user profiles, and establish usernames and passwords.

Professional online content creators and/or publishers are using myriad technologies to deliver and publish different types of media (video, audio, text, images) into their online presence/website. The result is that most websites are segregated by different types of media and require the audience to visit different sections of a website to access different types of content. For example: Videos would be in one section, podcasts would be in another, recipes and downloadable documents would be in yet another and so on.

The result of both, the different locations for users to share and the separate tools for media delivery into websites is a fragmented, non-user friendly experience that may also affect the value of that content and its ability to be monetized.

Therefore it is desirable to provide an all media story-telling system and method, that provides any media, integrated story-telling tools, provides content management/ distribution of such any/all media content as well as the syndication across multiple domains, and it is to this end that the disclosure is directed.

BRIEF DESCRIPTION OF THE DRAWINGS

FIGS. 5-8 illustrate examples of the user interfaces of the all media story-telling system;

DETAILED DESCRIPTION OF ONE OR MORE EMBODIMENTS

Figure 1:
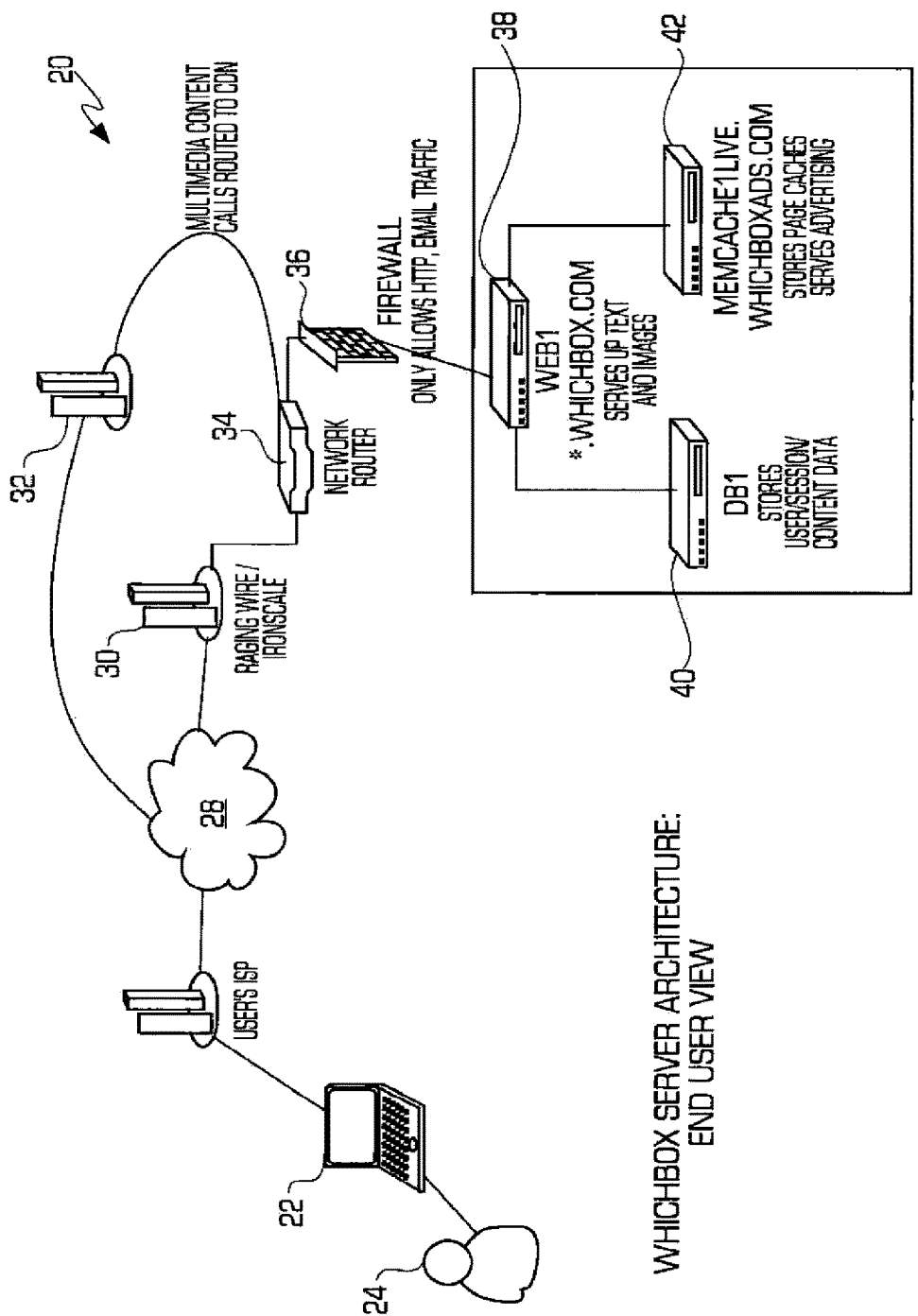
FIG. 1 illustrates an example of an implementation of an all media story-telling system.

The disclosure is particularly applicable to a web-based hardware/software system and it is in this context that the disclosure will be described. It will be appreciated, however, that the system and method have greater utility since the system can be implemented using other computer architectures, other implementations and/or have other user interfaces that are within the scope of the disclosure.

The all media story-telling system provides a place where content is aggregated and disseminated in a way that builds relationships between consumers and sellers by providing relevant content at the point where it is needed. While the all media story-telling system performs searches because relevant search results are part of integrated/aggregated content that is being served up, the core market are enthusiasts, people hungry for certain kinds of content, not generalists. The system may rely on experts (both recognized and emerging) to assemble compelling stories, (as opposed to hoping that an algorithm will work), and will integrate best-of-breed third-party vertical-market search functions to identify both directly relevant and related content.

The all media story-telling system provides any-media, integrated story-telling (also known as organic story-telling®.) The limitation of current systems is that the story-telling is fragmented and disconnected. For example, if a user wants to share story for a trip down Route 66 with videos. Pictures, sounds, etc., the user would have to put his video on YouTube, share his photos on Flickr or Photobucket (or on Facebook), tell the "written" part) of the story in a blog, and there is no current home for audio which fragments the actual story into multiple, disconnected pieces, but it also requires anybody who would like to get the "whole" story, to go to those multiple destinations to interact with or consume the individual, disconnected and overlapping elements of that story. The all media story-telling system provides tools that allow users to easily marry all those different components/elements into one story, by providing an easy to use, integrated story-telling process and interface. Using the all media story-telling system, the user would now be able to have ONE story in ONE place, which includes all those different pieces: the video, audio, text, images, photos, in any order a user would want to. The tools would allow the user to tell a story on any device and the tools can be used on any device.

The all media story-telling system may include a "story" framework that enables a user to create high-design, rich-media stories with little skill or experience. In addition stories have a function that will automatically parse rich-media contents to create a "story summary" component that will let users quickly access those story components from any story page, (e.g. videos, how-to, podcasts, etc.)—without having to navigate through the entire story to get to the specific components of that story.

The all media story-telling system also includes a user interface development/extensible theme framework that allows users to create "themes" (a combination of php templates, css code, JavaScript, and a variety of include files) to manage the user interface. These themes can be keyed to:

Domains
Taxonomy terms
Specific functions
Specific url paths
Specific story components The system may include built-in templates that allow the user to maintain a set of templates for common user interface elements, but also allows the user to maintain a separate set of templates and elements for domain- and function-specific user interface elements.

The all media story-telling system may also have a story entry workflow and user interface that manages a lot of rather complex backend operations, while presenting a seamless, intuitive, and easy to use interface for creating stories.

The all media story-telling system also provides production/story-telling management in which the system tracks the project lifecycle from ideation thru publishing. The system may perform story development and tracking with an orderable list of story components, component data uploaded, each component has aggregate time, user responsible, users who participated listed and has a separate listing of resource files by file type (image, logo/icon, movie, gallery.)

In the system, the story tasks are built on templates that have standard attributes including: Metadata & Summary, Components and Ads. Metadata and summary act as envelopes for the components and ads, and each object is individually assignable. The system also tracks feature development with an orderable list of feature components, feature data uploaded and each component has aggregate time, user responsible, users who participated listed. The system also tracks function development with an orderable list of function components, function data uploaded, use case and function description is part the feature "envelope", each component has aggregate time, user responsible, users who participated listed and feature documentation is created as part of feature development.

System Content Management/Distribution System

The all media story-telling system also provides content management/distribution and syndication across multiple domains. The system is an all-in-one platform for the creation, distribution, syndication and monetization of content, on the web and to other related platforms, i.e. mobile, TV etc. Currently, if a content owner/publisher wanted to publish the same story in most, multiple online environments, such a story would have to be duplicated or multiplied and managed as duplicates in multiple domains which results in a number of issues for online publishers including: possible duplication of content; possible version control issues; possible timing/release/take down issues; higher costs for IT and development, design etc., hosting and in-house staff (i.e. possible duplicate content management staff, since the publisher has multiple people doing the same thing with the same content; possible other layer of management on top of that, juts to "manage and keep in check); and missing out on the ability to "mash up" (combine) content from different sources into more compelling content living in one successful environment.

The all media story-telling system solves the limitations/problems of current content management systems using a CMS that can manage multiple domains at the same time—eliminating the need for duplication/multiplication of content, version control in multiple environments and timing, release and take down issues—since they can be handled form one central location.

The all media story-telling system also provides the ability to deliver content into multiple domains/sites from one location to allow users to discover such content in different places without the previous need to multiply. The system also provides the ability to deliver search results to users that can include content from other sites owned by the same content owner/online publisher, without the need for a separate, expensive installation of vertical search tools, etc. In particular, the WhichBox™ Media distribution platform does not segregate content based on creator, interest, or format; rather, it only delivers content and advertising based on the relevancy of the inquiry. The system also provides migration of users between multiple domains/sites of one publisher.

The all media story-telling system also provides the ability to "mash up" or combine content previously separated in different domains or environments where the content was previously separated by type of media. For example: rather than having users go to one place on the site where they can find videos, and another where they can find (text) stories, and yet another for photos etc., all the content can now be merged into integrated stories and distributed in any of the sites managed by the WhichBox™ all-in-one platform.

Story Framework

The system also provides a story-telling framework so that content will be served from one dataset, to many domains, all from a single point of entry. Virtual content domains are "skinned" using the theme framework described above to give the appearance of being separate locations. In fact, the system uses the same database tables to store all of the content from all domains, but the data is only permitted to be served to the targeted domain or domains.

This configuration enables publishers to maintain one repository of content and user data (instead of multiples). It also makes tracking user interests across verticals/domains more straightforward and creates more efficient internal processes.

This structure also allows a publisher to separate out content and user bases, if so desired. It may become apparent over time that some verticals/domains generate a lot more traffic than others, and it may become necessary to separate out a particular vertical's users and content from the others to allow the user to optimize the systems for traffic loads on specific verticals.

Relevancy Match in System

The system also creates and provides a relevancy match that includes the tools to advertise to and reach that elusive audience including: banner ads, in-text ads, video-pre-roll, interstitial, post-roll, preview ads, myspace and facebook profiles, YouTube channels, twitter accounts, blogs, micro-sites, etc.

Even though recent economic developments have not left online advertising untouched, advertising is still the single most successful engine driving monetization on the Internet. Nevertheless, the above mentioned types of ad serving companies have primarily focused on developing intrusive, and very often mass distribution tools for advertising, reaching large audiences, but missing the true connection to the target user/consumer. Attempts at behavioral targeting are resulting in consumer rejection and legislative efforts to curb the collection of individual user data and information.

Traditional click-through ads are mostly responded to by the wrong demographic. The sheer number of ads on any given page often results in users completely ignoring such advertising efforts all together. Social Networks are being pressured to monetize, however, their current architecture is forcing these efforts to focus on the user, targeting user activities and online connections (friends), rather than content.

The WhichBox™ Media advertising tools allow brands and advertisers to target individual pieces of content based on the metadata associated with the story and its elements, and in combination with the context of the site/domain, taxonomy etc. that specific content lives in. Consumers request specific content elements, which are delivered directly, in context, to the consumer in the environment where it was requested. This positions the brand favorably with the consumer by offering brand messages/advertising that is completely relevant to what the user is actually looking for.

The story-telling system also encourages brands to expand their ad campaigns to include advertorial content that tells a story. The definition of what is an ad, and what is content, can now defined by the user. For example, a short form video describing how to use Hershey's chocolate in a recipe could be an advertisement for one user and an interesting piece of content for another. Now, an example of an implementation of the all media story-telling system and method are described below.

The story-telling system implements a set of proprietary presentation templates that displays content within the context of advertising content that enhances the value of content being displayed through careful matching of advertising messaging with content being displayed.

FIG. 1 illustrates an example of an implementation of an all media story-telling system 20 in which one or more computing devices 22 are used by users 24 (typically using an ISP) to interact with a story-telling system 26 over a link 28. Each computing device 22 may be a processing unit based device with a display, memory and connectivity abilities to interact with the story-telling system 26 as described below. For example, each computing device 22 may be a personal computer, a laptop computer (as shown in FIG. 1), a tablet computer, a wireless phone, a PDA, a smartphone (iPhone, Blackberry or Palm device) and the like. The link may be a wireless or wired link, such as an Ethernet connection, a cellular network, a wireless digital data network, a computer network, etc.

The story-telling system 26 (that may be a story telling unit that is hardware based or a combination of hardware and software) may include, in one implementation, one or more virtual servers 36, such as scalable servers as shown, and a content delivery network 32, such as a CDN, which are connected to a router 34. These elements of the story-telling system 26 are outside of the story-telling system firewall 36 which only allows http and email traffic. Behind the firewall 36, the story-telling system 26 may include one or more web servers 38 (that can be implemented in software running on a server computer) that serve up applications such as my.whichbox™ and story builder, text and images to the users, one or more database servers 40 (that can be implemented in software running on a server computer) that store user data and content and serve data to the user, and one or more memory caches 42 (that can be implemented in software running on a server computer) that store page caches and serves advertising to the users.

In one implementation, the system may be one or more typical server computers running a Linux or FreeBSD-based operating system, Apache2, PHP 5.2 or better complied with the GD toolkit, APC, uploadprogress, xml, xmlrpc, fileinfo, curl, mysqli, pdo, memcache, mcrypt, and PEAR/PECL libraries, MySQL 5.x or better, Sendmail or Qmail, Memcached and Drupal 6.x for the content framework. The advertisements may be served using OpenX software. The system may also have various custom module hooks to add or remove display elements; alter module functions. The system may also have a Story_meta software module that creates links from story framework to story pages; extracts metadata from framework for use with pagination and story metadata widgets, a Whichbox localbox software module that aggregates, sorts and presents search results for the local domain being searched, a Whichbox™ software module that aggregates, sorts and presents search results across all Whichbox™ domains EXCEPT the current domain being searched and a Whichbox_library software module that aggregates, sorts and presents search results for Whichbox™ library citations related to the current search term.

Figure 2:
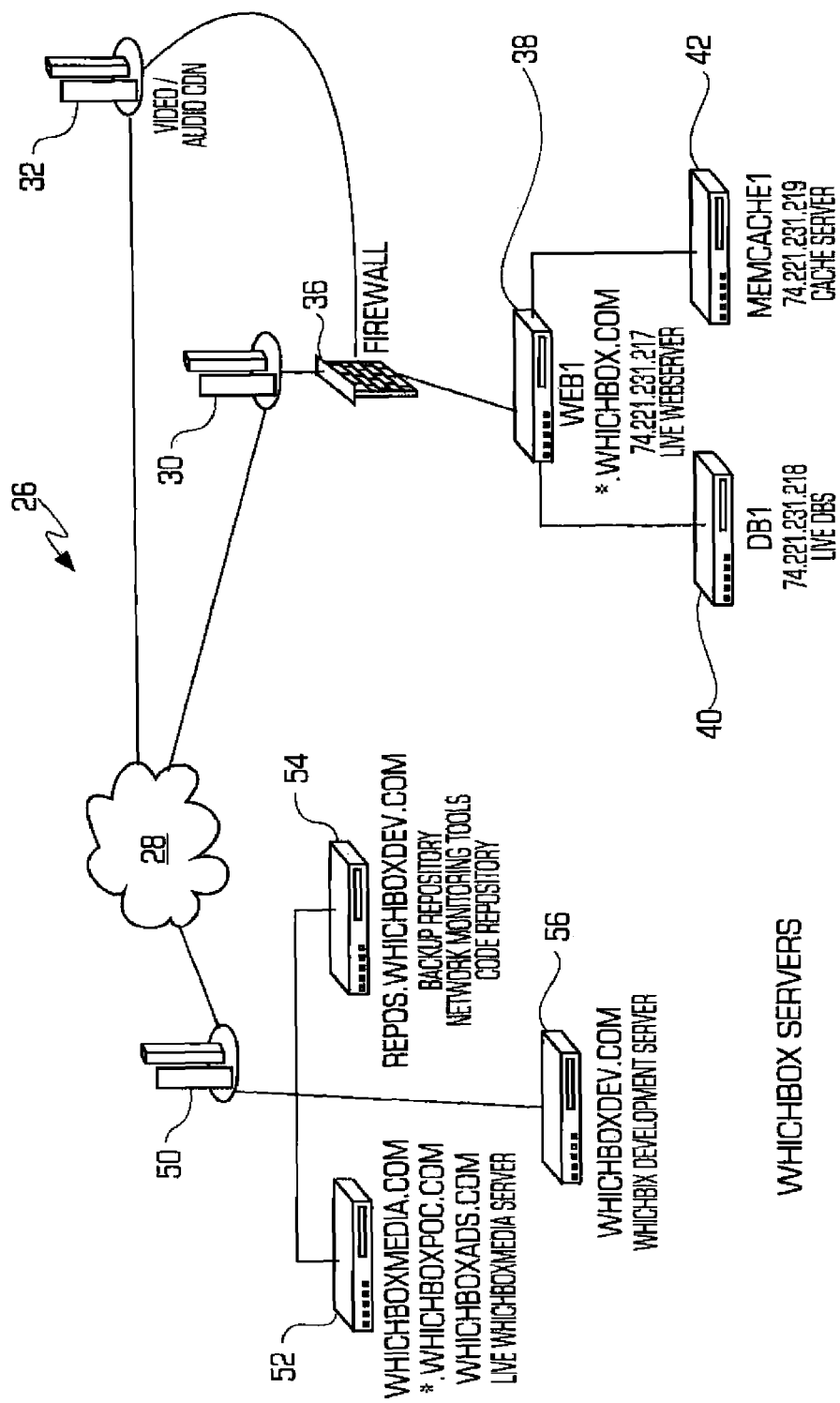
FIG. 2 illustrates more details of the all media story-telling system shown in FIG. 1.

FIG. 2 illustrates more details of the all media story-telling system shown in FIG. 1. In addition to the element described above in FIG. 1, the story-telling system 26 may also have one or more hosted servers 50, such as can be provided by Server/Hosting Company, which include a WhichboxMedia.com live server 52, a backup server 54 for backup repository, network monitoring tools and a code repository and a development server 56.

Figure 3:
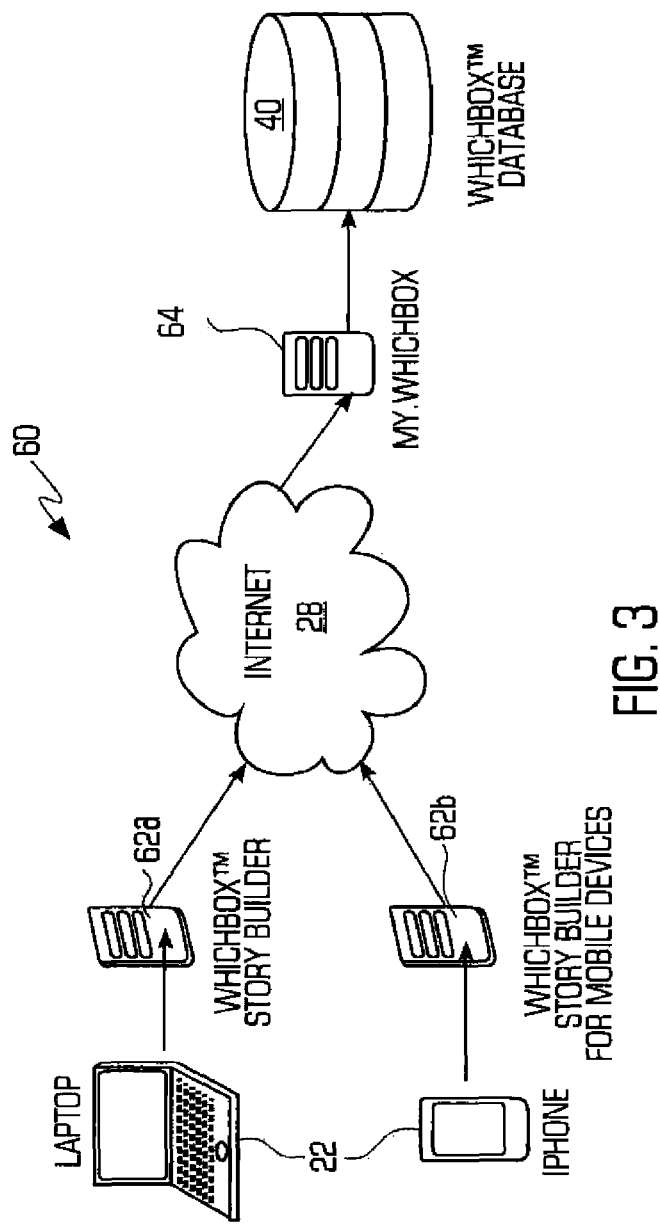
FIG. 3 illustrates an example of a story-telling input workflow of the all media story-telling system shown in FIG. 1.

FIG. 3 illustrates an example of a story-telling input workflow 60 of the all media story-telling system shown in FIG. 1. In particular, the story-telling system 26 provides a platform where stories can be created on any kind of digital input device capable of adding text and transmitting digital images and video. These stories, not just text snippets or individual images, are then assembled into the story framework described below, can be published to one or more domains, and can be reproduced in "real" form (e.g. printed on paper or turned into a presentation stored on a DVD).

As shown in FIG. 3, a user with a computing device 22, such as the laptop and iPhone as shown, interact with a story builder module 62 (implemented in software in one embodiment running of the server computers of the story-telling system) wherein the system may have different story builder modules for different types of computing devices, such as the story builder module 62a for a laptop/personal computer and a story builder module 62b for mobile devices such as the iPhone. The computing devices have different displays, computing power and memory which may affect the usability of the story building module so that the story-telling system has different story building modules for different computing devices. The data from those story building modules are communicated over the link 28 to the story-telling system. In particular, the story building module data for each user are sent to a my.whichbox™ module 64 stored in the story-telling system wherein each user may have their own personalized my.whichbox™ module that provides the user interface to the story-telling system. The data is then stored in the store 40 of the story-telling system for the user.

User Roles and Function

The story-telling system may recognize a variety of user types and roles and provides system access to different people based on roles assigned to their user accounts. An example of the core roles in the system (not an exhaustive list) may include:
1) Visitors: An anonymous visitor, identifiable only by IP address at a given time. Visitors may view and search Whichbox™ content, but they may not contribute content.
2) Contributors: A user who has provided a validated email address to Whichbox™ and have agreed to the Whichbox™ terms of use and publishing agreement. Contributors may contribute stories and add comments and participate in online forums. Further, subsets of contributors may be able to access ecommerce and advertiser relationships.
3) Content partners: Content partners are client "content administrators" that may contribute stories on behalf of authors they have independently contracted.
4) Content administrators: Content administrators are Whichbox™ staff who have the ability to promote and publish stories in multiple domains, moderate, edit and delete content; create relevant links and ads, moderate comments and forums; add content to feature pages, and in some cases, administer domain permissions, and user accounts and permissions; and
5) System administrators: Have the ability to administer various aspects of the system, commit code, delete content, manage databases, and enable/disable various functionalities on the system.

All authenticated users (contributors, content partners and administrators) will have public profiles created upon account creation. These profiles will be located and accessible via the mywhichbox™ application or other applications. User profiles will act as the nexus for a variety of widgets that integrate the users story-telling environment. The mywhichbox™ profile will allow Whichbox™ users to link accounts from other social media and content management sites to create a repository of their content available for them to draw on during the story creation process. These widgets are being developed as API interfaces to services like Facebook, Flickr, YouTube, and other content management services.

Story Telling System Content Specifications

The story-telling system may have various content specifications including feature pages that act as landing pages for Whichbox™ domains and departments. The Feature pages may use an "image carousel" to display stories selected by editors based on taxonomy or interest value. It may also displays a "tag cloud" that enables an end user to view some content by taxonomy term. Finally, feature pages maybe framed by ads and lists that direct users to other featured stories and lists of recently posted and most popular (based on the number of page views) stories.

The story-telling system may also have dictionary terms which are glossary terms which are content types that record terms and their definitions. Each story-telling system domain will have a glossary that aggregates definitions of technical terms associated with that box. The terms will be submitted by users and the definitions will not be rated. Short comments on the terms are allowed and comments will be integrated into the definition by an editor/expert. The dictionary terms may include the following fields:
Name of the Term
Image series
Origin
Description of what it means
Synonyms and acronyms
Related terms
blogs/diaries The Blogs/diaries may be only visible within user profiles, and may be kept separate from stories. A blog/diary is treated as a single, living story, whose pages are presented in sequence, according to when the page was created, without a fixed, last page. Unlike stories, blog comments are envisioned to live on the same screen as the blog page itself (instead of at the end of the blog).

The story-telling system may also include a library entry which is a citation created by a user that hyperlinks to a story somewhere else on the internet. Citations are created by automatic feeds create citations and thru user entry. Editors edit citations via a moderation queue, then publish, people will find citations via search (conflicts with user entered) and citations display on a contributors profile.

Story Structure

The story-telling system has a story architecture. A "story series" is the equivalent of a chapter book and is composed of a group of stories, separated into "Story Parts." For example: a story series with six chapters would be a six-part story series, made up of Part 1, Part 2, Part 3, etc. A user should be able to start a story series, OR, be able to assign an existing story (that they have created) to a story series whenever they want. Users should have the ability to modify a story series hierarchy at will. A series can only be published if it is attached to two or more stories that also are published. A draft series can be composed of published or unpublished stories. There is no cascading of "published" status from the series to the stories so that stories in a story series are mutually independent. A story series is composed of a title, a summary description, and a sorted list of its story parts.

The stories use the metaphor of a collection of articles or essays to display rich-media information. The components of stories in the story-telling system (described below in more detail) are:

1) Story series: A collection of story frameworks organized along common themes.
2) Story framework: A collection of rich-media pages.
3) Content pages: Pages which display content formatted in common ways, assembled to maximize exposure to relevant related content, (including advertising). Story pages are composed one at a time, with a user choosing to "create a story", then choosing a component type. The Content pages (described in more detail below) include (but are not limited to since the system can support/create an endless number of content types):
   a. Narrative: Text and images flowed together like a traditional magazine article.
   b. Video: Video content
   c. Audio: Audio content
   d. How-to: Text content formatted as a recipe or instructional list
   e. List: A numbered or bulleted checklist
   f. Image gallery: A gallery of images
   g. Downloads: A collection of downloadable files
4) Comment pages: The last page of any story displays comments from readers.

Although each type of media is described in the list above and below as being on a separate page, a story may also have a page that has a plurality of the different media types on the page or multiple pages wherein each of the multiple pages has a plurality of the different media types on the each page.

The story structure is designed to 1) let users add any number of pages to a story; 2) paginate the story (according to story-telling system story rules); and 3) then publish the story to one or more content domains simultaneously.

The story components above can be repaginated in random orders, at will, through a hierarchical ordering function within the story editing screen. In addition, stories will have user controlled version-control built into them (user has choice of creating a new version or simply changing the existing version).

The process of creating a story framework is managed through a set of proprietary processes and methods that:
Create a story framework;
Add a page;
Sort pages according to the story framework model;
Present pages in a specific order;
Present story parts to different users based on their editorial roles (i.e. users can edit stories until they're published; but editors and publishers can modify stories at any time).

Story Framework

The story-telling system story framework knits together stories and extracts relevant metadata from story pages to provide:
A table of contents that can be called from any page in the story, whose sections are distinguishable by both position within the story and content type;
A list of files associated with the story that can be downloaded;
Story metadata that can be called by any story page (e.g. story title, contributor, credits, date published or summary)

The story framework also controls editing access to the story during the story creation process. Permissions attached to the story framework allow the story to be edited, published, deleted, or simply viewed. The story framework can only be viewed or edited by the author (until it's published), or a domain editor (can be edited at any time). This is accomplished by examining its publishing status (draft or published), and then controlling access to the story framework (and its functions) to the contributor, editor, and viewers.

The user will be directed into a generic entry form (i.e. the form layout should be the same across domain and box verticals), where the user (based on individual permissions settings) can enter story metadata:
Title
Subtitle
Summary
Contributor (auto-entered, defaults to user account name)
Time created (auto-entered, defaults to time the node was created)
Promo
Credits In addition, the following metadata may be populated during the publishing step:
Taxonomy terms (field)
Box location (defaults to my.whichbox™ until changed during the publishing step)
Reaffirmation of publishing agreement (hash of date & IP address).
Publish date: Scheduled publish date Story/Content Pages Details Narrative Pages A narrative may contain a number of text components, whose style is specific to a box vertical. The components must include:
Body (basic text block)
A narrative may also include:
4-6 levels of subtitles
An embedded list (an ordered or unordered list; contains: listhead, listbody)
Tip (which may be plain text, ordered list or unordered list)
Quote (contains quotebody, and quotesource)
Did you know/DYK (A "did you know" is a kind of list, with a head and body, which may be text, and ordered list, or an unordered list)
Free tag taxonomy Tips, quotes and "did you knows" are treated as marginalia on page displays.

How-To Pages

A how-to is a specific kind of text containing the following mandatory data:
Title
Skill Level (select list: easy, takes some time, difficult)
Time to complete (hms time)
Cost to complete (currency based cost)
Creator (author name)
Top thumbnail
Tools (unordered list)
Supplies (unordered list)
Instructions (ordered list, subsidiary paragraphs can be unnumbered.)
A how-to may contain optional data, like:
Introduction
How-to card title
Free tag taxonomy
A how-to may contain data that can only be added by an editor (based on a partner agreement):
Sponsor (sponsor name)

Video Pages

A video page contains a mandatory:
Video player (and associated video file upload function)
It may also contain optional:
Title (Label: Video title)
Introduction
Quote
Tip
DYK
Free tag taxonomy When a user chooses a Video component, they will be prompted to add a title and upload the video. Upon upload, the system will automatically create 2 thumbnails (one smaller, one larger) based on a frame capture from X seconds into the video. The smaller thumbnail will be used for the node summary and listing purposes. The larger thumbnail will be used as a preview image for the video player when the video component loads.

The video player will be embedded in a css division in which a small ad banner can be delivered (e.g. 50×250 px), located at the bottom of the video screen OR on the side of a page).

The frame may be kept even if no advertising is delivered.

Audio Pages

An audio page only contains a mandatory:
Page section title (label: Audio title)
Audio flash player
Taxonomy terms (keywords)
It may also contain optional:
Introduction
Quote
Tip
DYK
Free tag taxonomy If there is only the audio player on the page, it may be centered; otherwise, additional components may have standards placements on the left and/or right of the player.

Audios are separate for business reasons: matching an advertiser with a piece of audio. Audio is played through an audio player that may or may not be branded.

The audio player will be embedded in a css division in which a small ad banner can be delivered (e.g. 50×250 px), located at the bottom (or side) of the audio player or other location as desired by a publisher.

Image Gallery Pages

An image gallery page contains image thumbnails, plus associated captions, organized into a multi column grid.
Image gallery pages contain a mandatory:
Gallery Title
Image
Image title
They may contain optional:
Gallery description
Free tag
Caption

Comment Pages

The comment section is an area that allows users to enter comments (with accompanying images and hyperlinks) that can be sorted and threaded using a variety of mechanisms, according to user preferences. Comments always appear at the end of stories, not embedded in story pages.

Story Use Cases

Use Case: User Wants to Create a Story

1) User goes to "Mywhichbox™"
2) User clicks on "create story"
3) User presented with entry screen
4) User fills in title, subtitle, summary, and uploads an image for the thumbnail and saves.
5) User selects the first story component they want to compose
6) User is presented with component entry screen
7) User fills in story component, saves
8) User is presented with story as it will display
9) User selects "edit" tab if they want to modify/add to the story.
10) User makes choice until they choose to complete the story.
11) When user completes the story, they are then asked to decide into which vertical (box) they want the story to be published, then tag the related box taxonomy categories, and add keywords.
12) Upon saving the story, the user is presented with story as it will display (but within the mywhichbox™ context), with a message asking whether they want it "published" or not.
13) If they chose to publish, take the user back to where they started creating the story.
14) When user chooses to publish, all versions (with the exception of the published version) are removed.

Use Case: User Wants to Create a Story Series

To create a story series, users need to already have created the individual stories that they want to assemble into a series.

1) User goes to "mywhichbox™"
2) User clicks on "Create Story Series"
3) User is presented with an entry screen
4) User fills in Story Series fields, saves
5) User is presented with a screen prompting them to select the first story in the series (e.g. "Create Story")

Story Rules

A story is only visible to the contributor (and content administrators) until published.

Once a story is published, it may be displayed in a contributors profile area, along with lists of their favorite stories, links, and external citations.

Content administrators have permissions to change or delete any content. Contributors may only change their own content (for as long as their specific permission settings allow them to do so).

When a story is created, a framework node is created and weighted as the first page. Then, a comments node is created and is weighted as the last page. Subsequent pages are initially paginated in creation order, but can be re-weighted to appear in a different order.

Finally, the story-telling system has a tool that simplifies the creation of stories and story series using a graphical interface (rather than a forms-based interface) that is the story builder module that is now described in more detail.

Story Builder Details

Figure 4:
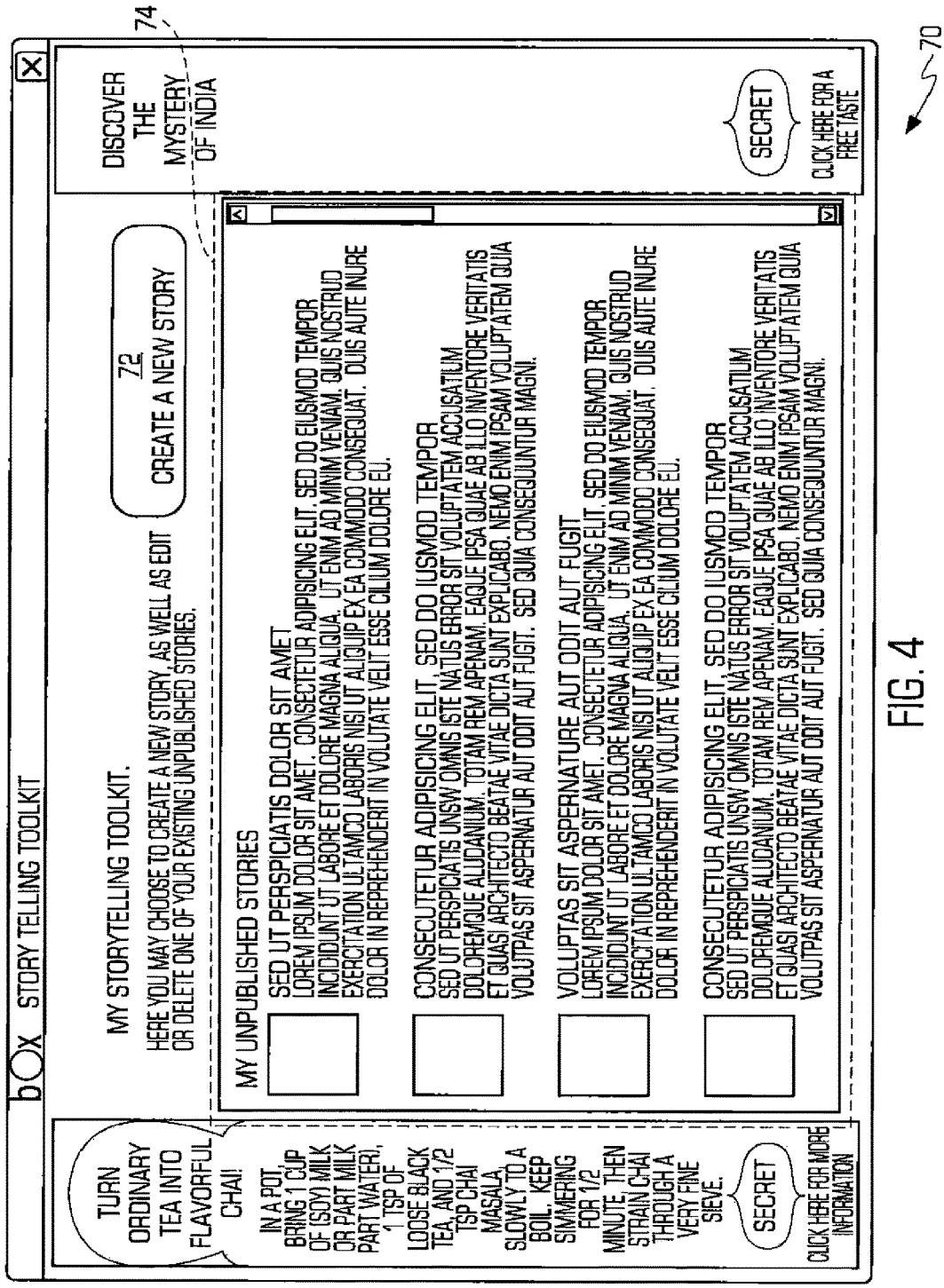
FIG. 4 illustrates an example of a story processing and publishing workflow of the all media story-telling system shown in FIG. 1.

The story builder creates a platform-independent "story palette" which allows a user to select a page type, add content to that page, then assemble the story into a relevant narrative flow. The story builder structures the story so that relevant parts of the story are accessible to various types of users based on their publishing and editorial roles. For example, FIG. 4 illustrates an example of a user interface 70 for a my story-telling toolkit for a particular user. The user interface may include a button 72 to create a new story as well as a portion 74 that lists the unpublished stories of the particular user.

Figure 5:
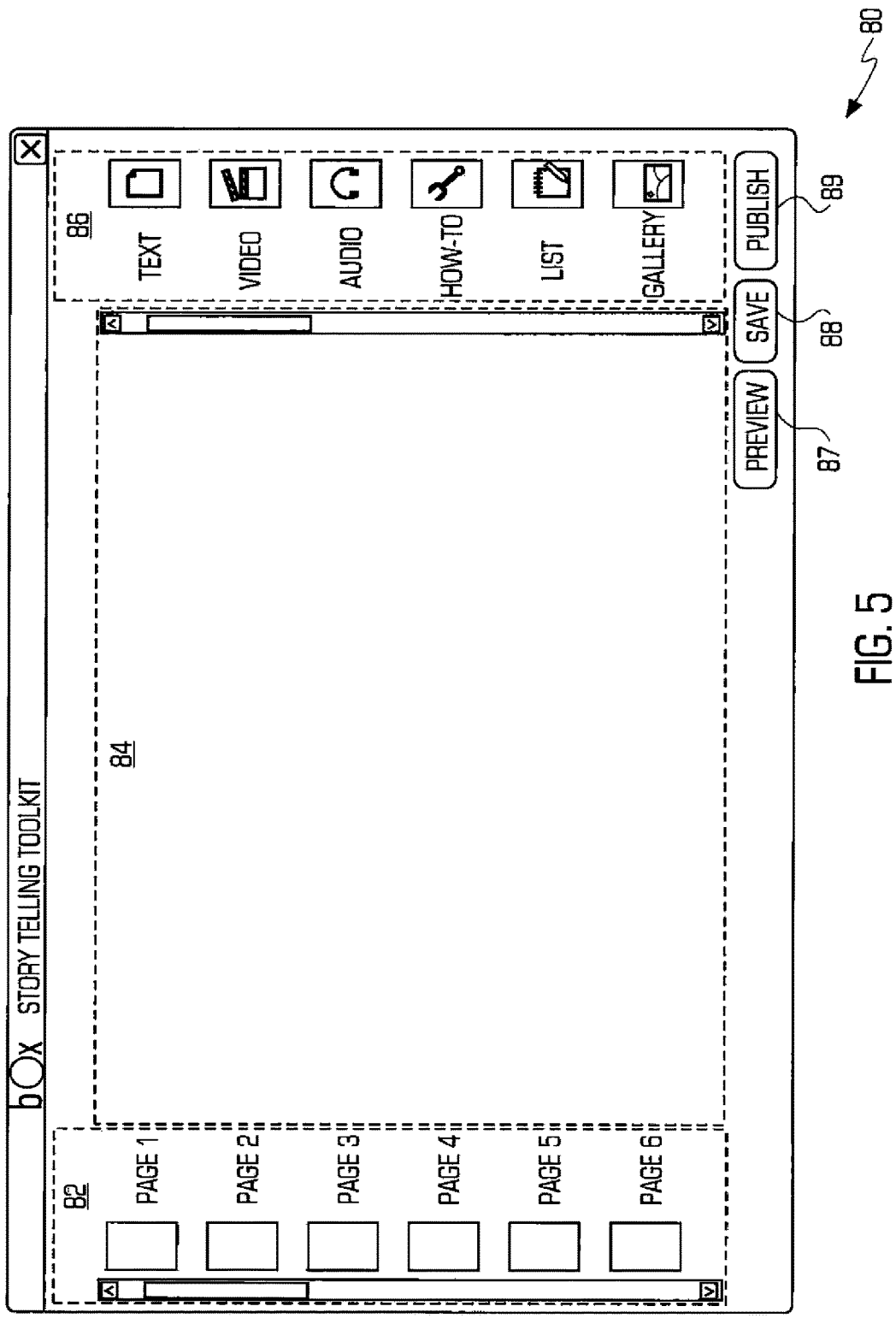
Figure 6:
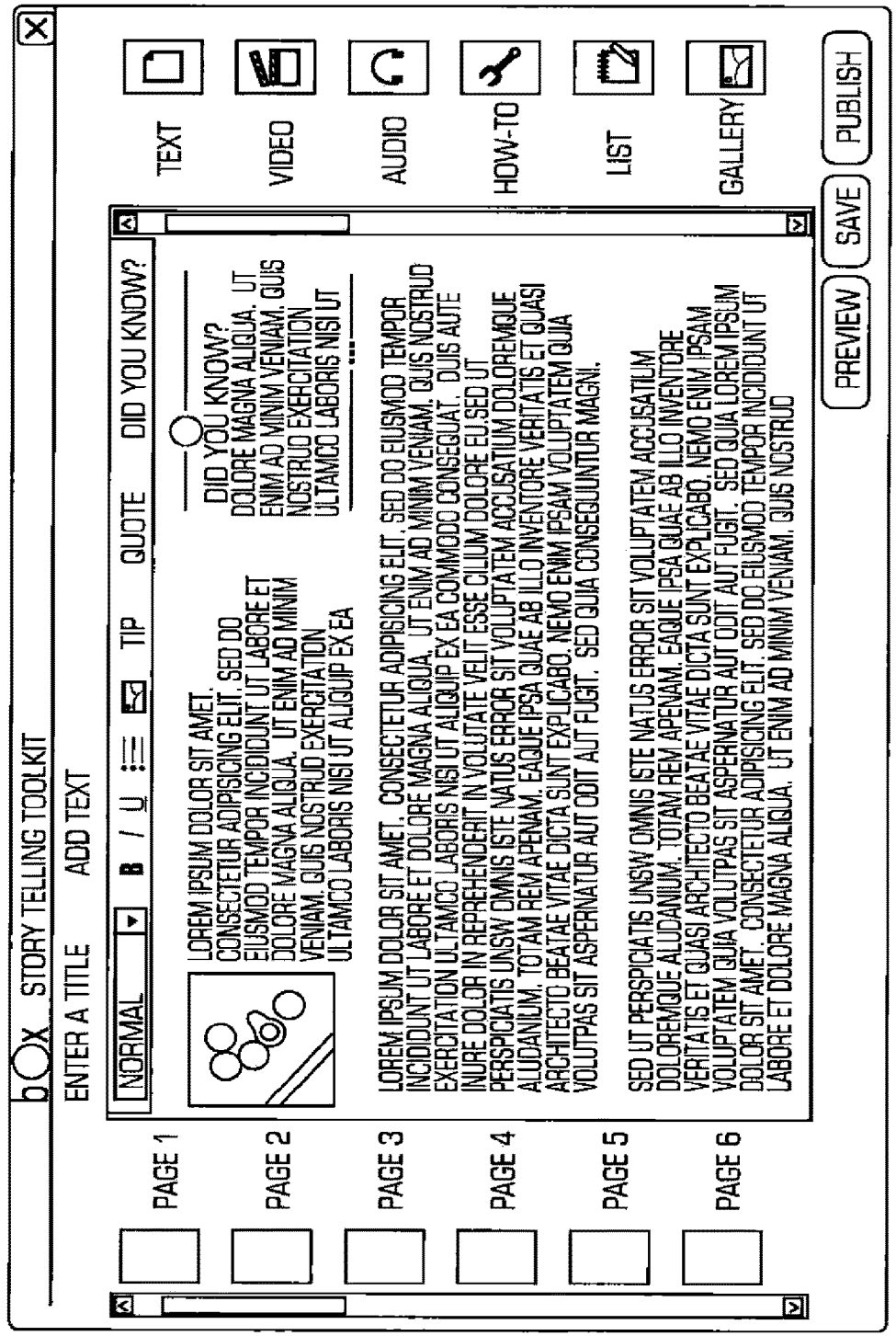
Figure 7:
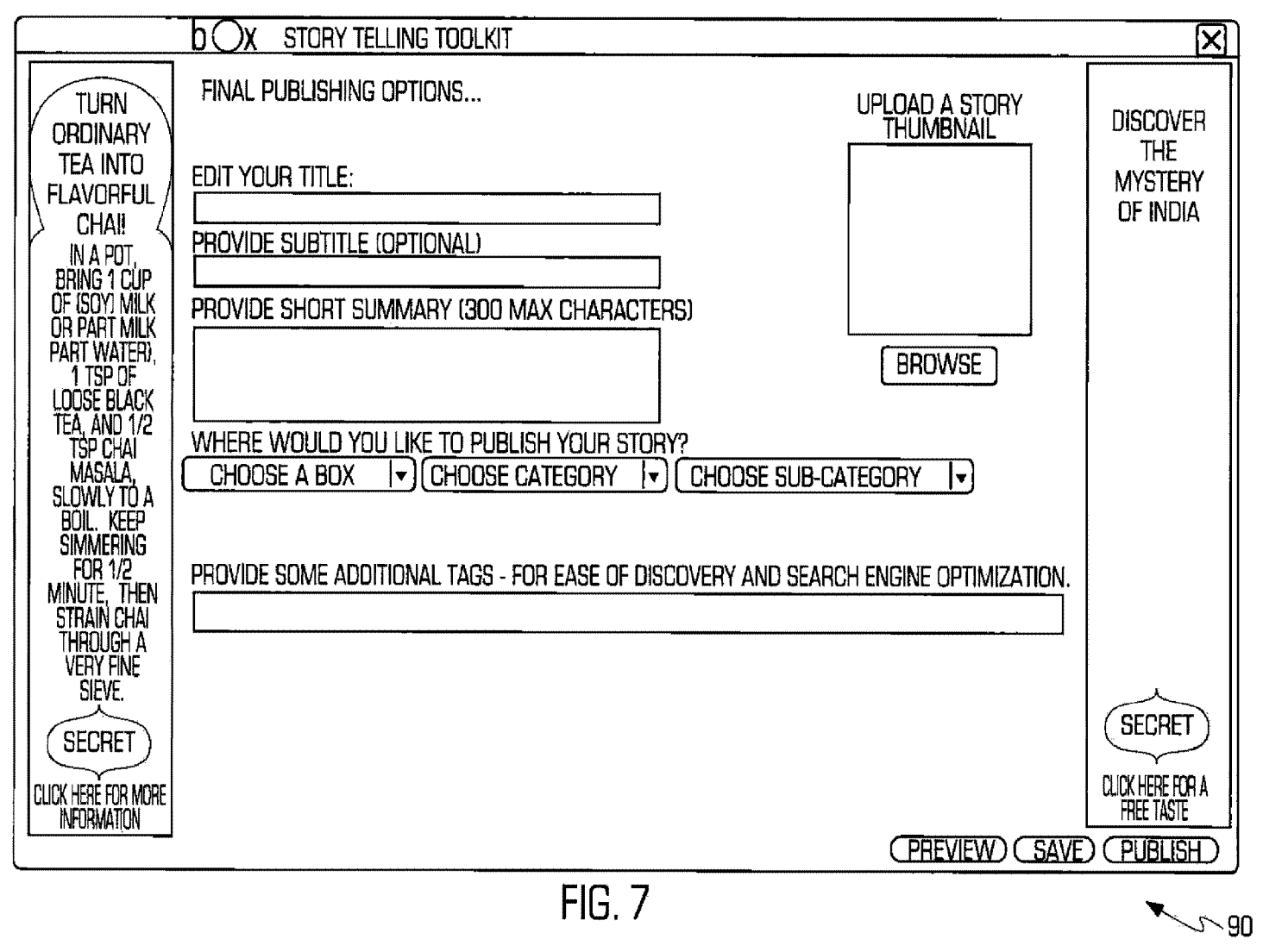

FIG. 5 illustrates an example of a user interface 80 for creating a new story. The user interface has a page portion 82 that provides a list (in this case thumbnails) of each page of the story, a story page creation portion 84 and a templates portion 86 that has the various different media and other items associated with a story (a text template to add text into one or more story pages, a video template to add video into one or more story pages, an audio template to add audio into one or more story pages, a how-to template with how-to story tips, a list template to add a list into one or more story pages and a gallery template to add a gallery of images into the one or more story pages.) The user interface may also include a preview button to preview the story/page, a save button 88 to save the story/page into the store and a publish button 89 to publish the story. FIG. 7 illustrates an example of the user interface 80 for creating a new story with the at least a page created. The user interface also has a portion that allows the user to enter a title and perform various formatting processes.

Once a user is satisfied that a story is ready for publication, the story builder then connects with the story-telling servers, prompts a user to select where the story should be published, and then retrieves the completed story from the user's input platform (computer or mobile phone) and provides final publishing options.

Figure 9:
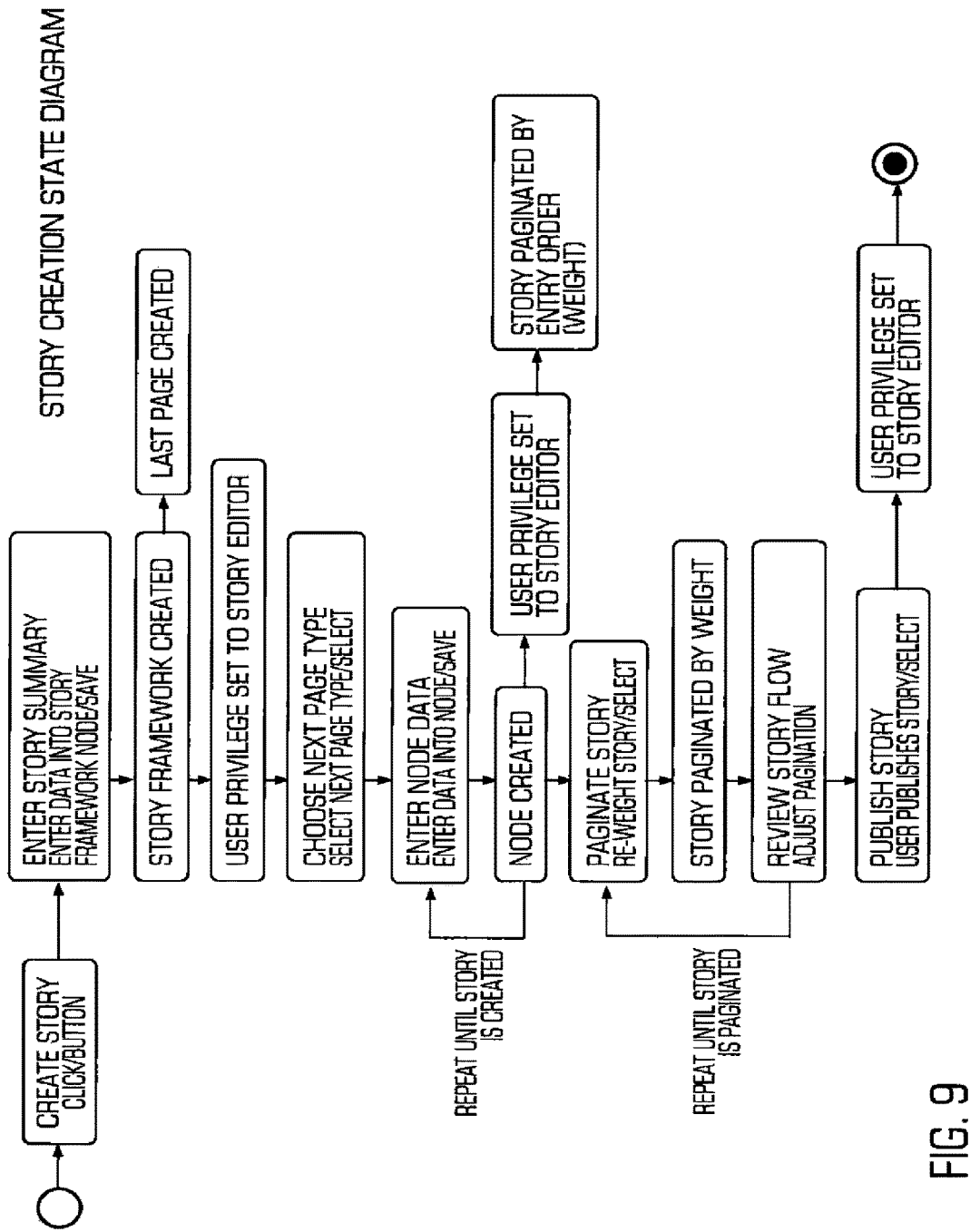
FIG. 9 illustrates a story creation state diagram of the all media story-telling system.

FIG. 9 illustrates an example of a user interface 90 for a final publishing options screen of the story builder. The user interface allows the user to edit the title of the story, to browse and upload a thumbnail to be published with the story, provide a subtitle for the story (which may be optional), provide a short summary of the story, allow the user to select a box into which to categorize the story. Category and sub-category in which to publish the story and allows the user to add tags for the story. Now, the overall story processing and publishing process of the story-telling system is described in more detail.

Figure 8:
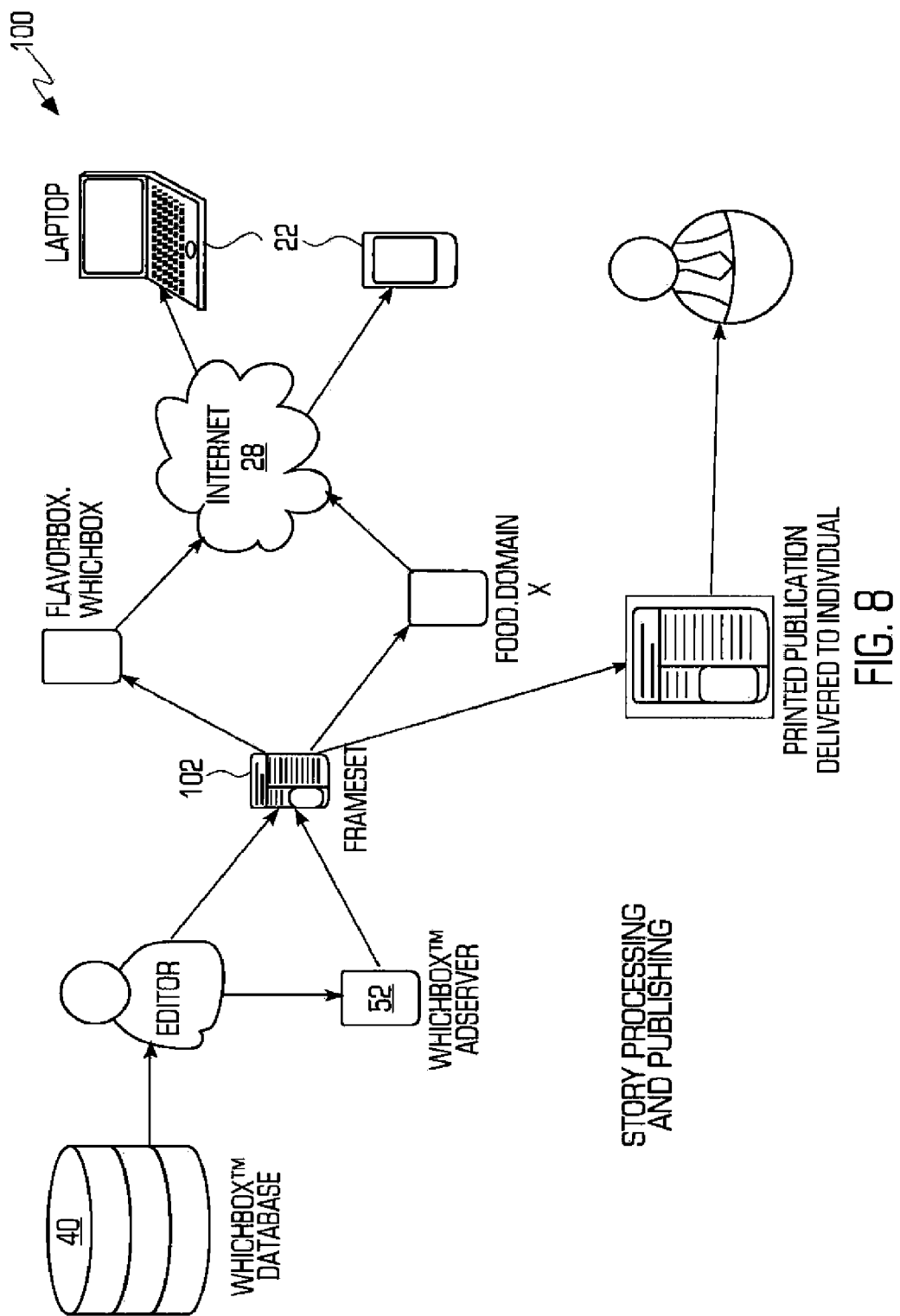

FIG. 8 illustrates an example of a story processing and publishing workflow 100 of the all media story-telling system shown in FIG. 1. When a story is uploaded to the story-telling system, the various media types are physically stored in different systems 40: text is stored as database content; images are stored as files on the filesystem (and are then mirrored to a content-delivery network); video and audio content are transcoded to a standard format (currently Adobe Flash in one implementation) and are stored on a content-delivery network. Graphic ads are stored (and then are delivered from) a separate ad server (or ad-serving network). When the story is stored in the system, it may then be reviewed by a human editor for relevant connections with other content (both user contributed and advertiser-sponsored content), with the help of tools designed to highlight possible relevant connections. The system does not make a distinction between advertising content and user-contributed content: all content is treated as a story, and stories presented next to each other should be relevant. The system uses taxonomy terms, content-analysis, and domain source as the initial keys for determining content relevancy. Further, the system employs subject-matter experts to provide links between stories to provide a holistic information experience.

The story-telling system treats advertising as "sponsored stories": it serves to enhance the core story, and not to detract attention from the primary story narrative. Consequently, advertising is treated as simply another type of story content, delivered up by a specialized ad server 52 that tracks relevant data including how many times an ad has been displayed, how many times people have "clicked-thru" an ad, how long an ad has been presented to a user, etc. Contextual advertising on the story-telling system can also be controlled by users in that the story-telling system:

- Allow users to establish which advertisers they would like to have associated in their stories;
- Provide the ability for advertisers to approve or disapprove serving their content into contributors stories, and
- Broker payments between advertisers and content providers.

Returning to FIG. 8, the editor's comments and the ads from the ad server 52 are combined together into a Frameset 102 which can then be categorized into a box (flavorbox. whichbox™ in this example) and/or a category (food in this example) and then published over the link 28 to one or more computing devices 22. The story-telling system can also generate a printed publication to send to a particular individual. Now, more details of the story creation process using the story-telling system are described.

Figure 10:
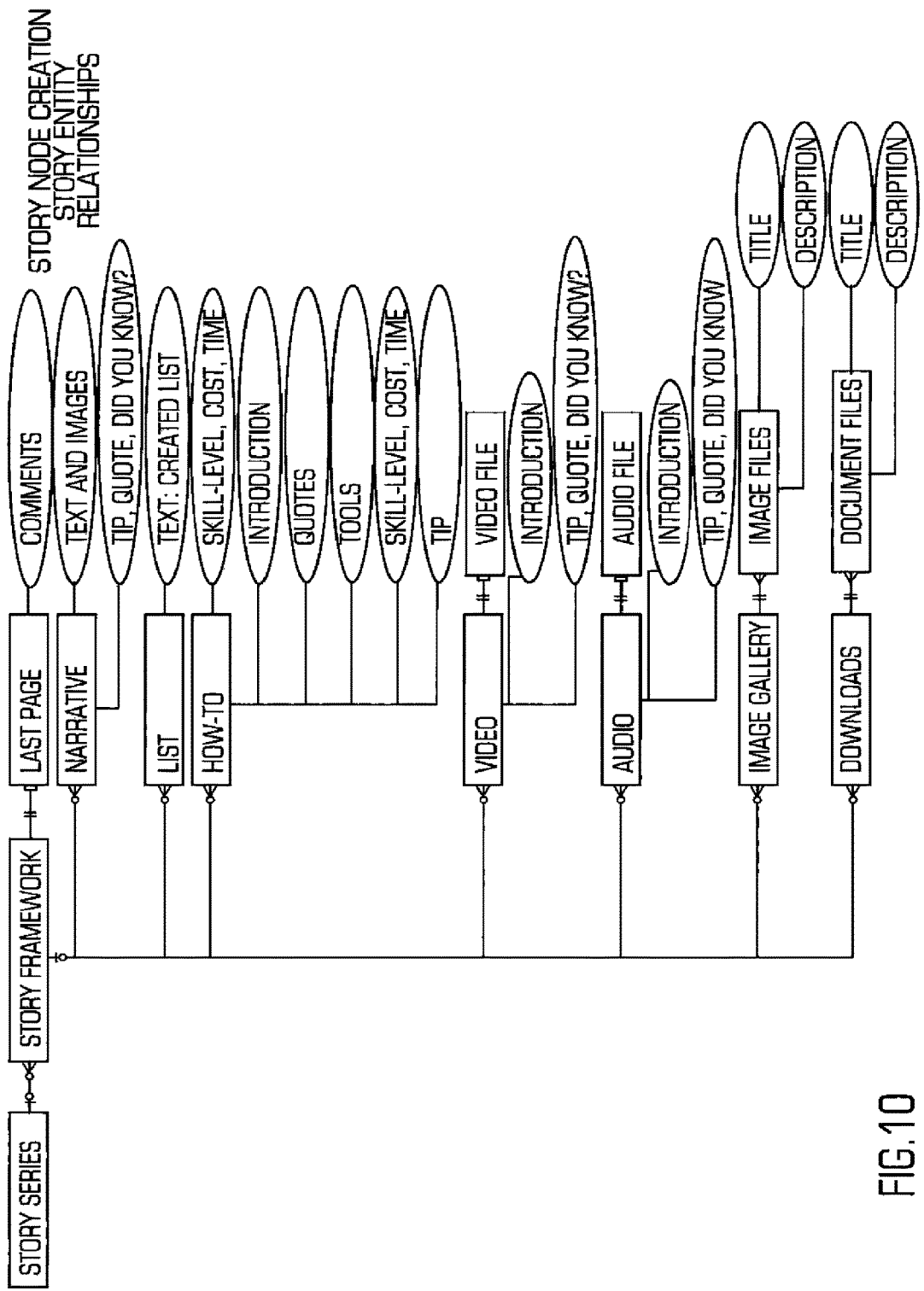
FIG. 10 illustrates a node creation method of the all media story-telling system.

FIG. 9 illustrates a story creation state diagram 110 of the all-media story-telling system. Initially, the user elects to create a story 111 using the button described earlier. The process is shown in FIG. 9. Part of the process includes creating a node and the process for story node creation and story entity relationships are shown in FIG. 10.

The system also may include analytic tools that measure content engagement. The analytic tools measure engagement factors with the goal of informing people what kind of stories and methods of story-telling are the most engaging (and therefore, lucrative). To start, the analytics tools measure baseline content performance statistics: how long it takes to serve up content; how long a user views content (both stories and pages); what content one or more users prefer (i.e. number of story views and number of page views); what kinds of content are most compelling (do videos actually create more interaction between the user and the content, or are perhaps image galleries more effective in engaging user interaction with content). In addition, the analytics will attempt to measure relevance by tracking click-thrus to relevant content, and then attempt to discover relationships between knowledge domains by analyzing click paths in an attempt to uncover content relationships relevant to distinguishable groups of users. Finally, the analytics will attempt to reveal trends that reveal patterns of engaging story-telling. In particular, being able to identify specific features that make stories readable (e.g. "people spend more time on stories with checklists than stories that relay a list through a narrative format," or "people tend to spend more time with image galleries than with videos," or vice versa) will enable us, over time, to provide coaching to content providers and advertisers about how to create compelling content, and consequently, to make more money.

The system also may implement ecommerce services that will enable contributors to establish virtual storefronts and enable monetization of their content.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. An all media story-telling system, comprising:
a story telling unit;
one or more computing devices connectable to the story telling unit over a link and exchanging information with the story telling unit, each computing device having a different set of characteristics;
the story telling unit further comprising one or more server computers configured to manage the interaction between each computing device that is connected to the story telling unit, to store user data and content associated with the story telling unit; and
the story telling unit further comprising a plurality of story builder modules that gather data for a multimedia story from each computing device and each story builder module corresponding to each computing device having the different set of characteristics, wherein the data is content of different media types, a module that provides a personalized user interface to the story telling unit for each user of the system and analytic tools that measure content engagement including measurement of baseline content performance statistics and identification of features of a story that make the story readable.

2. The system of claim 1, wherein the story builder module creates a new story for a user by allowing the user to create a story framework and add a page into the story.

3. The system of claim 1, wherein the story framework further comprises a table of contents, a list of files associated with the story and story metadata.

4. The system of claim 1, wherein the story builder module further comprises a story pallet that allows the user to add content to the page of a story.

5. The system of claim 1, wherein the story builder module further comprises a user interface with one or more templates for each type of content.

6. The system of claim 1, wherein the data for the multimedia story is one of a narrative, a video, a piece of audio, a how-to, a list, an image gallery, a download are and a comments area.

7. The system of claim 5, wherein the template is one of a text template, a video template, an audio template, a how-to template, a list template, an image gallery template, a download template and a comments template.

8. The system of claim 1, wherein the story telling unit further comprises a story publishing unit that generates the story for a plurality of domains.

9. The system of claim 1, wherein the story telling unit further comprises an advertising unit that inserts one or more advertisements into the story.

10. The system of claim 1, wherein the story builder module is a plurality of lines of computer code executed on the server computers of the story telling unit.

11. The system of claim 1, wherein the set of characteristics for each computing device comprises a display, computing power and memory.

12. The system of claim 1, wherein the story telling unit further comprises a relevance match unit that generates advertisements based on the content of the story.

13. The system of claim 1, wherein the link is one of a wireless link, a wired link, a cellular network, a wireless digital data network and a computer network.

14. The system of claim 1, wherein each computing device is a processing unit based device with a display and memory.

15. The system of claim 14, wherein each computing device is one of a personal computer, a laptop computer, a tablet computer, a wireless phone, a PDA and a smartphone.

16. An all media story-telling method, comprising:
creating, using a computer based story telling unit, a new story;
selecting, based on a computing device having a particular display, computing power and memory, a particular story builder module;
entering, using the particular story builder module of the story telling unit, a summary of the story, wherein the summary includes a title, subtitle, summary and an image for a thumbnail;
entering one or more story components of the story using the particular story builder module, wherein each story component may be one of a piece of text, a video, an audio, a how-to, a list, an image gallery, a download area and a comments area;
generating the story based on the one or more story components; and
measuring content engagement including measuring baseline content performance statistics and identifying features of a story that make the story readable.

17. The method of claim 16 further comprising selecting a vertical into which the story is to be published and presenting the story as it will be published to the user.

18. The method of claim 17 further comprising allowing the user to create a story series.

19. The method of claim 16 further comprising inserting one or more advertisements into the story.

20. The method of claim 16 further comprising generates advertisements based on the content of the story and inserting the generated advertisements into the story.

* * * * *